United States Patent

Lamparter

[11] Patent Number: 5,860,385
[45] Date of Patent: Jan. 19, 1999

[54] CROSSING ARM ASSEMBLY

[75] Inventor: Ronald C. Lamparter, Grosse Pointe Shores, Mich.

[73] Assignee: Transpec Inc.

[21] Appl. No.: 714,283

[22] Filed: Sep. 17, 1996

[51] Int. Cl.⁶ .................................................. B60R 21/34
[52] U.S. Cl. ........................ 116/28 R; 280/762; 293/119
[58] Field of Search ................. 116/28 R, 35 R, 116/36, 37, 51–53, 63 R, 28 L; 340/433, 480, 487, 472, 488–490; 243/117, 118, 119; 280/762; 180/271, 281; 40/538, 549, 591, 605, 607, 611, 612, 618

[56] References Cited

U.S. PATENT DOCUMENTS

| | | | |
|---|---|---|---|
| 3,153,398 | 10/1964 | Runkle et al. | 116/28 R |
| 4,073,082 | 2/1978 | McWhorter | 40/591 |
| 4,697,541 | 10/1987 | Wicker | 116/28 R |
| 5,132,662 | 7/1992 | Burch | 340/433 |
| 5,199,754 | 4/1993 | Freeman | 293/117 |
| 5,226,686 | 7/1993 | Triggs et al. | 293/117 |
| 5,277,146 | 1/1994 | Hughes, Jr. | 116/63 R |
| 5,281,948 | 1/1994 | Estrada | 340/433 |
| 5,355,117 | 10/1994 | Jefferson | 340/425.5 |
| 5,357,239 | 10/1994 | Lamparter | 340/433 |
| 5,392,728 | 2/1995 | Speer et al. | 116/63 R |
| 5,463,973 | 11/1995 | Tait | 116/173 |
| 5,564,359 | 10/1996 | Harder | 116/28 R |
| 5,620,219 | 4/1997 | Servant | 116/28 R |

*Primary Examiner*—Diego F. F. Gutierrez
*Assistant Examiner*—Andrew Hirshfeld
*Attorney, Agent, or Firm*—Reising, Ethington, Learman & McCulloch

[57] ABSTRACT

A school bus is equipped with a crossing arm mechanism that is mounted on the front bumper at the passenger side. The mechanism includes a crossing arm assembly that is pivoted between a retracted (stored) position adjacent the front bumper and an extended (operative) position where the crossing arm assembly extends outwardly of the bus bumper in a perpendicular fashion to control pedestrian traffic. The crossing arm assembly includes a plastic bracket that is pivotally attached to an actuating mechanism and a cantilever beam that is attached to the bracket at one end. The bracket has two vertically spaced pivot arms and a beam mounting portion that supports the cantilever beam. The cantilever beam is a plastic extrusion that comprises upper and lower tubular sections that are interconnected by a web portion. The extrusion is modified at one end for attachment to the bracket.

17 Claims, 2 Drawing Sheets

CROSSING ARM ASSEMBLY

BACKGROUND OF THE INVENTION

This invention relates generally to safety equipment for school busses and more particularly to a crossing arm assembly for mounting on the front end of a school bus. When the school bus stops the crossing arm assembly is extended to a perpendicular position to prevent departing passengers from crossing immediately in front of the school bus as shown in U.S. Pat. No. 5,357,239 granted to me Oct. 18, 1994. In my earlier patent the crossing arm assembly, also referred to as a safety gate, is shown as a solid bar that is attached to a metal bracket at one end for pivotally mounting the solid bar on a housing.

Attempts have been made to provide improved crossing arm arrangements. For instance, U.S. Pat. No. 4,697,541 granted to James H. Wicker Oct. 6, 1987 discloses a crossing arm unit that comprises a short pivot plate of a sturdy relatively heavy gage metal (e.g. 3.5 in. of 14 gauge steel), a longer support plate 32 of relatively light gage metal (e.g. 20 in. of 0.08 in. aluminum plate) and a long U-shaped rod (e.g. 4 ft. of ¼ in. aluminum rod). According to the Wicker patent specification the crossing arm unit is light weight to avoid structural problems with its pivotal support, is easily supported, is simple in construction, and is economical to manufacture. The Wicker patent at column 1 also states that crossing arms have been made of light weight fiber glass rods and that his construction is an improvement over these prior art constructions.

The Wicker construction, however, is unduly complicated particularly when assembly is taken into account. Moreover, the long U-shaped rod is fragile, deforms easily and requires a strut that further complicates the construction and adds to the expense of the Wicker construction. Furthermore, the U-shaped rod which serves as the pedestrian barrier has low visibility.

U.S. Pat. No. 5,199,754 granted to Lowell J. D. Freeman discloses a crossing arm or barrier which is of tubular fiberglass construction. While the Freeman crossing arm is simple in construction in comparison to the Wicker construction, the Freeman single rod is also fragile and also has low visibility.

U.S. Pat. No. 3,153,398 granted to George LaVerne Runkle and Gilbert S. Sheets Oct. 20, 1964 discloses a crossing arm structure that comprises a channel shaped section of light sheet metal that is stiffened by a U-section having out-turned legs fixed to the back of the channel shaped section. The crossing arm assembly is shaped to fit in a recess in the front bumper and also includes a rubber guard structure that has a hollow rectangular center portion that is cemented to the channel section and flange portions that seal off the bumper recess.

This crossing arm structure of this arrangement is also unduly complicated and expensive to manufacture. Furthermore the arrangement requires a hinge structure for attaching the crossing arm to the bumper that further complicates the construction and adds to the expense.

SUMMARY OF THE INVENTION

The object of my invention is to provide a crossing arm assembly that is light weight, sag resistant and economical to manufacture and able to withstand considerable abuse.

A feature of the invention is that the crossing arm assembly is of plastic construction so that the crossing arm assembly is durable, corrosion resistant and economical to manufacture.

Another feature of the invention is that the crossing arm assembly includes a bracket of plastic construction that comprises a front molded part and a rear molded part that are secured together to provide a strong light weight bracket that includes pivot arms and a cantilever beam mounting portion.

Still another feature of the invention is that the crossing arm assembly includes an elongated cantilever beam in the form of a plastic extrusion that is economical to manufacture.

Yet another feature of the invention is that the crossing arm assembly includes an elongated cantilever beam of unitary, plastic construction that is strong and durable.

Still yet another feature of the invention is that the crossing arm assembly includes an elongated cantilever beam of unitary, plastic construction that is adapted for high visibility.

In another aspect, an important feature of the invention is an elongated beam per se that is light weight, sag resistant, strong and yet somewhat flexible so that it is particularly useful for a pivotally mounted cantilevered barrier. These desirable characteristics are provided by configuring the elongated beam with two vertically spaced tubular sections that are interconnected by a laterally flexible vertical web. The tubular sections and the vertical web resist bending in the vertical direction so that the elongated beam does not sag in use. At the same time, the tubular sections resist bending in the horizontal direction individually while the laterally flexible web allows relative movement of the tubular sections in the lateral direction and provides a torsional flexibility so that the elongated beam gives laterally if an obstacle is encountered.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
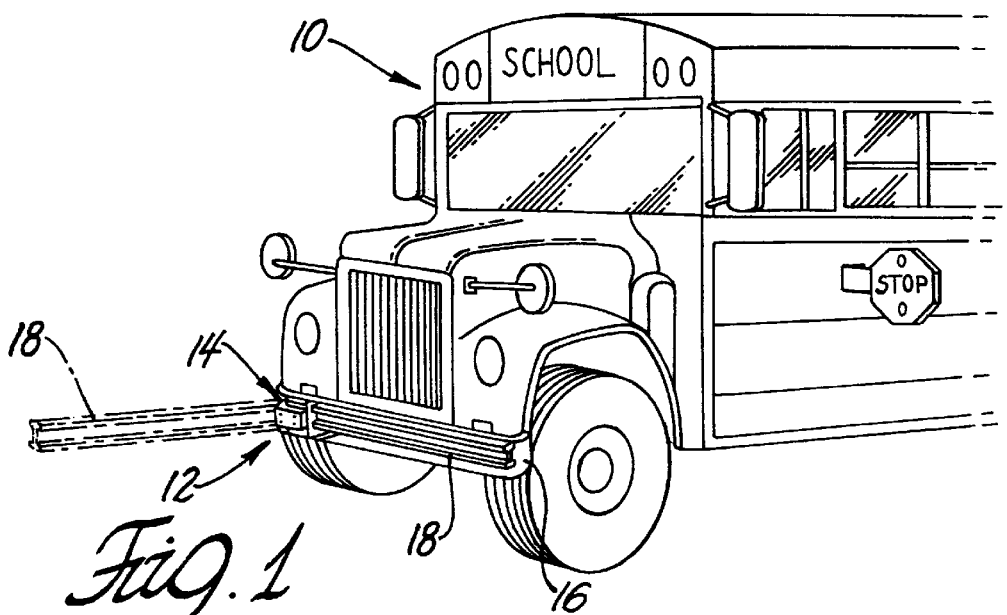
FIG. 1 is a partial perspective view of a school bus equipped with a crossing arm in accordance with the invention.

Referring now to the drawing, FIG. 1 shows a school bus 10 equipped with a crossing arm mechanism generally at 12. The crossing arm mechanism 12 comprises a sealed electrical actuator assembly 14 that is mounted on the front bumper 16 of the school bus 10 at the passenger side and a crossing arm assembly 18 having integral arms that are hinged on the actuator assembly 14 for pivotal movement. The actuator assembly 14 pivots the crossing arm assembly 18 between a retracted (stored) position adjacent the front bumper 16 of the school bus 10 and an extended (operative) position where the crossing arm assembly 18 extends outwardly of the bus bumper 16 in a perpendicular fashion as shown in FIG. 1 in solid and phantom lines respectively.

The actuator assembly 14 of the invention provides a tamper proof and weather proof environment for several electrical and mechanical components including an electric motor and a motor control circuit for pivoting the crossing arm assembly 18 back and forth between the stored position and the operative position.

The structure of the actuator assembly 14 is explained in detail in my copending U.S. patent application Ser. No. 08/654,680 filed May 29, 1996 (Attorney Docket Transpec P-324) which is incorporated herein by reference. Another suitable actuating device is shown in my prior U.S. Pat. No. 5,357,239 granted Oct. 18, 1994.

Referring now to FIGS. 2–6 of the drawing, the crossing arm assembly 18 is shown in detail. The assembly comprises a bracket 20 of plastic construction that is pivotally attached to the actuator assembly 14 secured to the bus bumper 16 and a cantilever beam 22 of plastic construction that is attached to the bracket 20 at one end.

The plastic bracket 20 comprises a rear molded part 24 and a front molded part 26 that are substantially mirror images of each other. The bracket parts 24, 26 are secured together to form two vertically spaced, hollow pivot arms 28 at one end and a beam mounting portion at the other end that is indicated generally at 30. Each hollow pivot arm 28 holds a plastic elbow 32 that includes a vertical pivot pin 33 that extends outwardly of an integral flange that engages the pivot arm 28 and into a journal portion of the actuator assembly 14. A flanged brass bearing ring 35 may be provided between the flange and pivot pin 33 and the journal portion of the actuator assembly 14.

The beam mounting portion 30 of the bracket 20 comprises a lower hollow, triangular support gusset 34 that has a narrow horizontal blade 36 at the top, a lower hollow horizontal rectangular tube 38 connected to the blade 36 and an upper hollow horizontal rectangular tube 40 spaced above the tube 38 in the vertical direction. The beam mounting portion further includes a short vertical blade 42 connecting the inboard ends of the rectangular tubes 38 and 40.

The various members of the two part bracket 20 described above all have a rear component and a front component that are an integral part of rear molded part 24 and front molded part 26 respectively as best shown in FIGS. 3–6.

Figure 2:
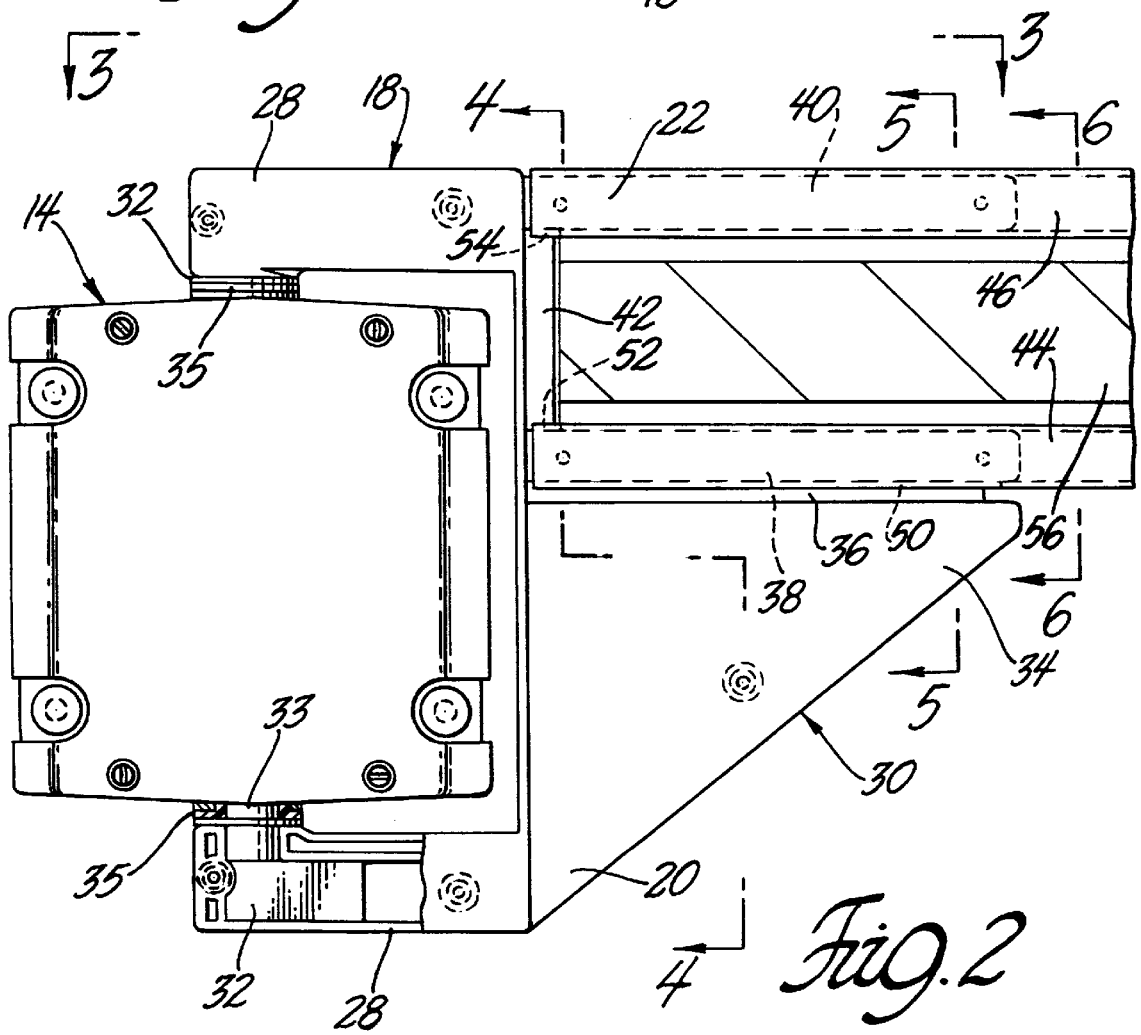
FIG. 2 is a front view of crossing arm assembly shown in FIG. 1 when the crossing arm is in the retracted position.
Figure 3:
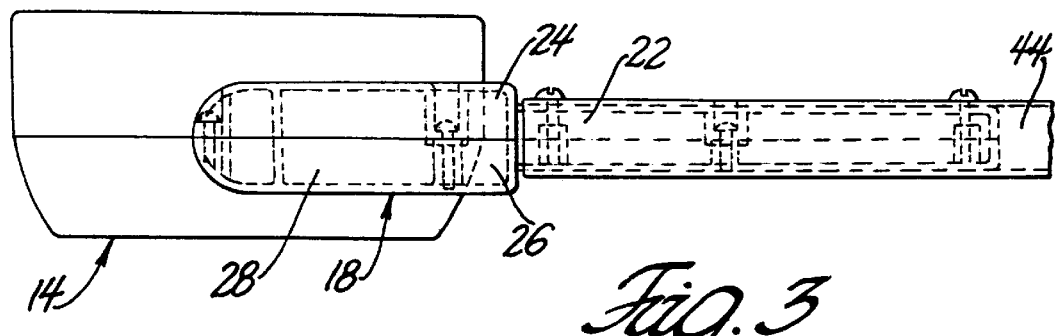
FIG. 3 is a section taken substantially along the line 3—3 of FIG. 2 looking in the direction of the arrows.
Figures 4, 5, 6:
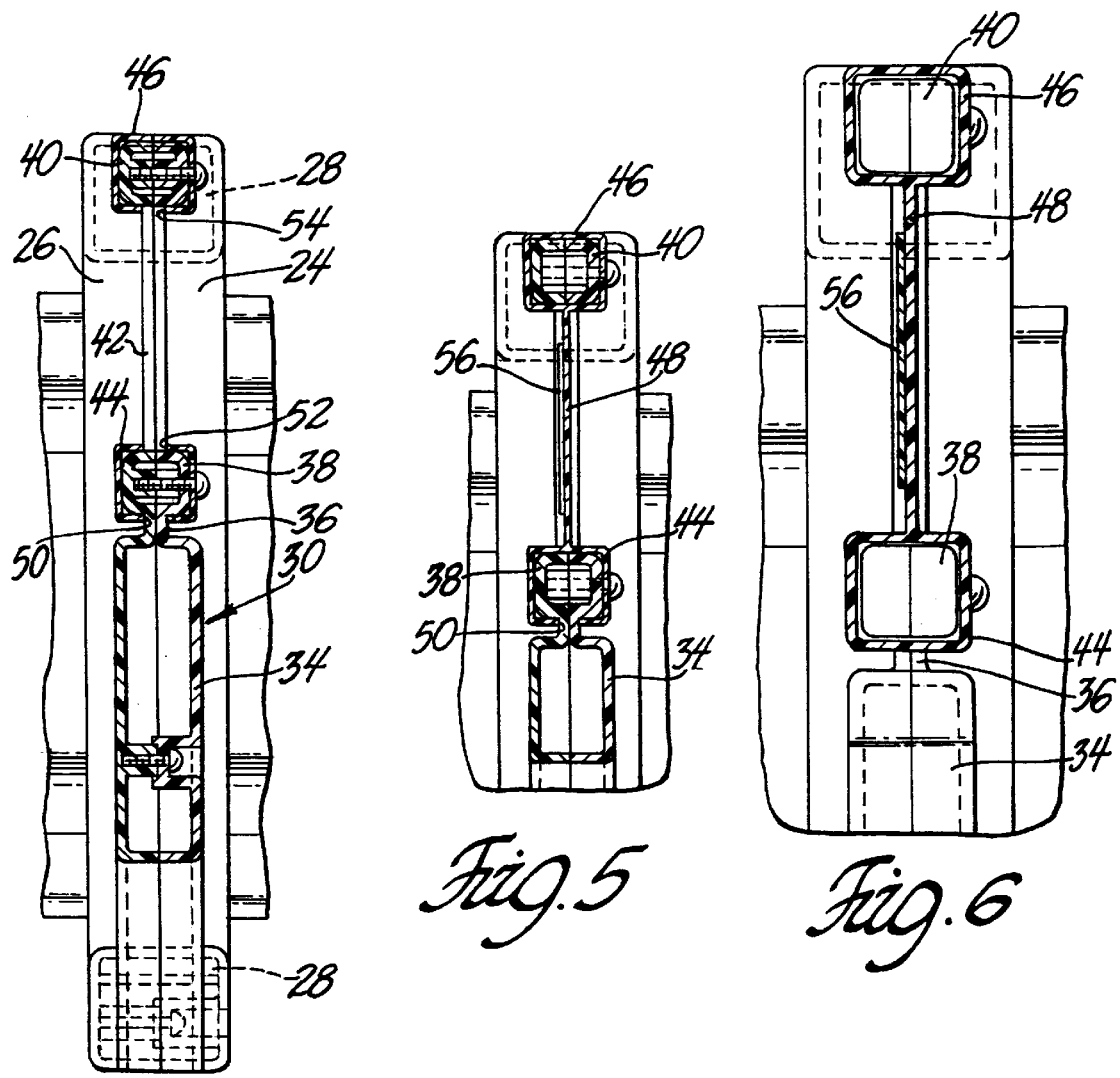
FIG. 4 is a section taken substantially along the line 4—4 of FIG. 2 looking in the direction of the arrows.
FIG. 5 is a section taken substantially along the line 5—5 of FIG. 2 looking in the direction of the arrows.
FIG. 6 is an enlarged section taken substantially along the line 6—6 of FIG. 2 looking in the direction of the arrows.

The cantilever beam 22 is a plastic extrusion that comprises upper and lower box sections 46 and 44 that are thin walled, typically 0.050 inches, but relatively stiff due to their shape. These relatively stiff, thin walled box sections 44 and 46 are interconnected by a thin web 48 which is typically 0.075 inches in thickness. Thus thin web 48 is laterally flexible but still stiff in the vertical direction. The plastic extrusion comprising the relatively stiff box sections interconnected by a laterally flexible web is modified at one end for attachment to the bracket 20. More specifically the lower box section 44 has slit 50 in the lower wall for receiving the horizontal bracket blade 36 and a short slit 52 in the upper wall for receiving the vertical bracket blade 42. The lower wall of the upper box section 46 also has a short slit 54 for receiving the vertical bracket blade 42. The inboard end portion of the web portion 48 is cut away so that the inboard end is spaced from the inboard ends of the box sections 44 and 46 to accommodate the vertical bracket blade 42 as best shown in FIG. 2.

The beam 22 is secured to the bracket 20 by inserting the tubes 38 and 40 into the box sections 44 and 46 and then fastening the back walls of the box sections 44 and 46 to the tubes 38 and 40 with screws or other suitable fasteners.

The bracket 20 and cantilever beam 22 may be made of any suitable plastic material that is strong, weather resistant and durable.

The cantilever beam 22 of the crossing arm assembly 18 is also preferably made highly visible. For instance, the web portion 48 preferably has a smooth front face between the box sections 44 and 46 so that a highly visible, reflective tape of striking colors, such as the diagonally stripped black and yellow tape 56 can be adhered to the front face of the web portion 48 along its entire length. This high visibility can be augmented by molding the beam 22 so that the outer surface of the box sections 44 and 46 are also yellow.

While the box sections 44 and 46 that are shown as square or rectangular in cross section are preferred, tubular sections of other shapes can be used as well so long as the resulting beam does not sag to any significant degree bearing in mind that the beam 22 is usually a minimum of five (5) feet in length. For instance, the tubular sections 44 and 46 can have a cross section of any closed shape including circular, oval and other polygonal cross sections. In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A crossing arm assembly of plastic construction for pivotal attachment to the front end of a school bus for blocking pedestrian traffic from crossing immediately in front of the school bus when the school bus is stopped comprising;

a bracket that is adapted for pivotal attachment to a support and an elongated cantilever beam that is attached to the bracket at one end of the beam;

the bracket having two molded plastic parts that are secured together to form two vertically spaced pivot arms and a beam mounting portion;

the beam mounting portion including a lower hollow, triangular support gusset that has a narrow horizontal blade at the top, a lower hollow horizontal rectangular tube connected to the horizontal blade, an upper hollow horizontal rectangular tube and a short vertical blade disposed between and connected to inboard ends of the rectangular tubes;

the elongated cantilever beam being in the form of a plastic extrusion that comprises upper and lower stiff box sections that are interconnected by a flexible web portion, the lower box section having a slit in a lower wall receiving the horizontal blade and a short slit in an upper wall receiving the vertical blade;

the upper box section having a short slit in a lower wall receiving the vertical blade;

an inboard end of the web portion being spaced from inboard ends of the box sections to accommodate the vertical blade, and the elongated cantilever beam being secured to the bracket by the tubes being disposed in the box sections and fastened to the back walls of the box sections.

2. The crossing arm assembly as defined in claim 1 further wherein the pivot arms are hollow and the crossing arm assembly further comprises an elbow that is held in each arm and that includes a respective pivot pin that is disposed outwardly of the pivot arm.

3. The crossing arm assembly as defined in claim 1 wherein the web has a smooth front face between the box sections and the crossing arm assembly further comprises a visible tape that is adhered to the front face of the flexible web.

4. A crossing arm assembly of plastic construction for pivotal attachment to the front end of a school bus for blocking pedestrian traffic from crossing immediately in front of the school bus when the school bus is stopped comprising;

a bracket that is adapted for pivotal attachment to a support and an elongated cantilever beam that is attached to the bracket at one end of the beam;

the bracket having two molded plastic parts that are secured together to form two vertically spaced pivot arms and a beam mounting portion;

the beam mounting portion including a lower hollow support gusset, a lower tube supported by the gusset and an upper tube spaced from the lower tube in the vertical direction;

the elongated cantilever beam being of unitary plastic construction including vertically spaced tubular sections of closed geometric cross section that are interconnected by a flexible web, and the tubes of the bracket being disposed in the tubular sections and fastened to the tubular sections to secure the cantilever beam to the bracket.

5. The crossing arm assembly as defined in claim 4 wherein the tubular sections have a cross section that is polygonal.

6. The crossing arm assembly as defined in claim 4 wherein the tubular sections have a cross section that is round.

7. The crossing arm assembly as defined in claim 4 wherein the tubes of the bracket and the tubular sections of the cantilever beam have cross sections that are of a similar closed geometric shape.

8. An elongated, sag resistant, plastic beam for a crossing arm assembly adapted for pivotal attachment to the front end of a school bus for blocking pedestrian traffic from crossing immediately in front of the school bus when the school bus is stopped, the plastic beam comprising;

upper and lower tubular sections of closed geometric cross section that are vertically spaced from each other, an integral web interconnecting the tubular sections that is laterally flexible so that the tubular sections can move relative to each other in the lateral direction, and the upper and lower tubular sections and the flexible web being modified at one end of the beam for attachment to a support in cantilever fashion, the lower tubular section having a lower side with a slit for receiving a beam mounting portion.

9. The elongated plastic beam as defined in claim 8 wherein the plastic beam is an extrusion that is modified at the one end.

10. The elongated plastic beam as defined in claim 8 wherein the upper and lower tubular sections have thin walls and polygonal cross sections.

11. The elongated plastic beam as defined in claim 8 wherein the upper and lower tubular sections have thin walls and round cross sections.

12. The elongated plastic beam as defined in claim 8 wherein the flexible web has a smooth front face and wherein a tape is adhered to the smooth front face to improve visibility.

13. An elongated, sag resistant, plastic beam of one piece construction for a crossing arm assembly adapted for pivotal attachment to the front end of a school bus for blocking pedestrian traffic from crossing immediately in front of the school bus when the school bus is stopped, the plastic beam comprising;

upper and lower tubular sections of closed geometric cross section that are vertically spaced from each other, the upper and lower tubular sections having a minimum length of approximately five feet, a thin stiff integral web interconnecting the tubular sections substantially along the entire length thereof, the web being laterally flexible so that the tubular sections can move relative to each other in the lateral direction, and the upper and lower tubular sections and the flexible web being modified at one end of the beam for attachment to a support in cantilever fashion, the lower tubular section having a lower side with a slit for receiving a beam mounting portion.

14. The elongated plastic beam as defined in claim 13 wherein the plastic beam is an extrusion that is modified at the one end.

15. The elongated plastic beam as defined in claim 13 wherein the web has a thickness of approximately 0.075 inches.

16. The elongated plastic beam as defined in claim 15 wherein the upper and lower tubular sections have thin walls that are approximately 0.050 inches in thickness.

17. The elongated plastic beam as defined in claim 13 wherein the flexible web has a smooth front face and wherein a tape is adhered to the smooth front face to improve visibility.

\* \* \* \* \*

UNITED STATES PATENT AND TRADEMARK OFFICE
CERTIFICATE OF CORRECTION

PATENT NO.      :   5,860,385

DATED           :   January 19, 1999

INVENTOR(S)     :   Ronald C. Lamparter

It is certified that errors appear in the above-identified patent and that said Letters Patent is hereby corrected as shown below:

In the patent, column 5, claim 4, line 18 after "two molded plastic parts that" delete "arc" and insert therein --are--.

Signed and Sealed this

Twenty-seventh Day of March, 2001

*Attest:*

NICHOLAS P. GODICI

*Attesting Officer*  Acting Director of the United States Patent and Trademark Office